Nov. 12, 1968     R. F. REILLY ET AL     3,410,060
XEROGRAPHIC FILTER APPARATUS
Filed Sept. 30, 1964     6 Sheets-Sheet 4

INVENTORS
RICHARD F. REILLY
JOHN W. WAGNER
BY

FIG. 8

3,410,060
XEROGRAPHIC FILTER APPARATUS
Richard F. Reilly, Webster, and John W. Wagner, Penfield, N.Y., assignors to Xerox Corporation, Rochester, N.Y., a corporation of New York
Filed Sept. 30, 1964, Ser. No. 400,490
4 Claims. (Cl. 55—376)

This invention relates to xerography and, in particular, to an improved filter box and bag assembly for removing xerographic toner particles from air in the exhaust system of the plate cleaning station of a xerographic machine.

In the process of xerography, for example, as disclosed in Carlson Patent 2,297,691, issued Oct. 6, 1942, a xerographic plate, comprising a photoconductive insulating material on a conductive backing, is given a uniform electric charge over its surface and is then exposed to the subject matter to be reproduced, usually by conventional projection techniques. This exposure discharges the plate areas in accordance with the light intensity which reaches them and thereby creates an electrostatic latent image on or in the plate coating.

Development of the electrostatic latent image is usually effected by an electrostatically attractable material, which is generally a thermoplastic resin in the form of finely divided particles usually in the size range from 3 to 20 microns, commonly referred to as toner or toner powder. In the development of the electrostatic latent image, the toner powder is brought into surface contact with the coating and is held thereon electrostatically in a pattern corresponding to the electrostatic latent image. The developed image is then transferred to a suitable support material, such as paper, and fused thereon to make a permanent image. In the xerographic transfer step substantially all of the resin material or toner is caused to adhere to the support material to form the images thereon, but usually a very small percentage of the resin material or toner remains on the xerographic plate.

The small quantity of resin material or toner remaining on the xerographic plate will affect future operating steps of the xerographic process and if left remaining thereon has an accumulative effect in that additional residual toner particles would adhere more readily to the xerographic plate in both image and non-image areas thereon.

As disclosed in the Turner, Jr., et al. Patent 2,751,616, issued June 26, 1956, a rotating brush in peripheral contact with the surface of the xerographic plate may be used to clean the xerographic plate of any residual resin material or toner adhering thereon. The brush, in turn, may be cleaned by a flicking bar disclosed in the above-referenced patent and by a vacuum system similar in structure to that of the common household vacuum cleaner, whereby dust, that is residual resin material or toner, is entrained in air and then filtered from the air by a suitable filter device.

In conventional vacuum cleaners it has been common practice to filter dust particles from an air stream by means of disposable filter bags of the type disclosed in Meyerhoefer Patent 2,720,277, issued Oct. 11, 1955, in which the filter bags are made of suitable air-pervious material, such as paper.

Paper filter bags of the type disclosed in the above-referenced Meyerhoefer patent usually operate with a pressure differential of about 50 to 60 inches of water across the surfaces of the filter bag. It is apparent that a rather high pressure type fan or blower is required to produce this large a pressure drop across the filter bag. A fan or blower of the type generally used in a vacuum cleaner usually operates at a relatively high speed with a resultant high noise level which to many people is objectionable.

It is also common practice to make filters out of loosely assembled fibrous webs or mats, of fiber glass, since it is known that these loosely assembled fibrous webs or mats are very porous and that only a relatively small pressure differential is required to force air through a filter made of fiber glass. However, existing filters made of fiber glass are not self-supporting, per se, but instead they are usually formed as a liner within a suitable filter support made of, for example, perforated cardboard or sheet metal. In the usual filters made of fiber glass, the effective area of the filter is greatly reduced by these structural supporting elements.

In copending application Ser. No. 306,651, filed Aug. 23, 1963, in the name of Robert F. Osborne and Patsy J. Pugliese, Jr., and Ser. No. 213,942, filed Aug. 1, 1962, in the name of Benson et al., there are disclosed self-supporting filter bags fabricated from fiber glass.

It is, therefore, an object of this invention to provide an improved filter box and disposable filter bag assembly capable of being operated for an extended period of time at a pressure differential of one-half to two inches of water across the faces of the filter bag for filtering dust particles of the type contemplated herein.

Another object of this invention is to improve xerographic filtering apparatus utilizing a filter bag having a clamp arrangement adapted to secure the filter bag to the discharge duct in the exhaust system of a xerographic machine.

For a better understanding of the invention as well as other objects and further features thereof, reference is had to the following detailed description of the invention to be read in connection with the accompanying drawings, wherein.

Figure 1:
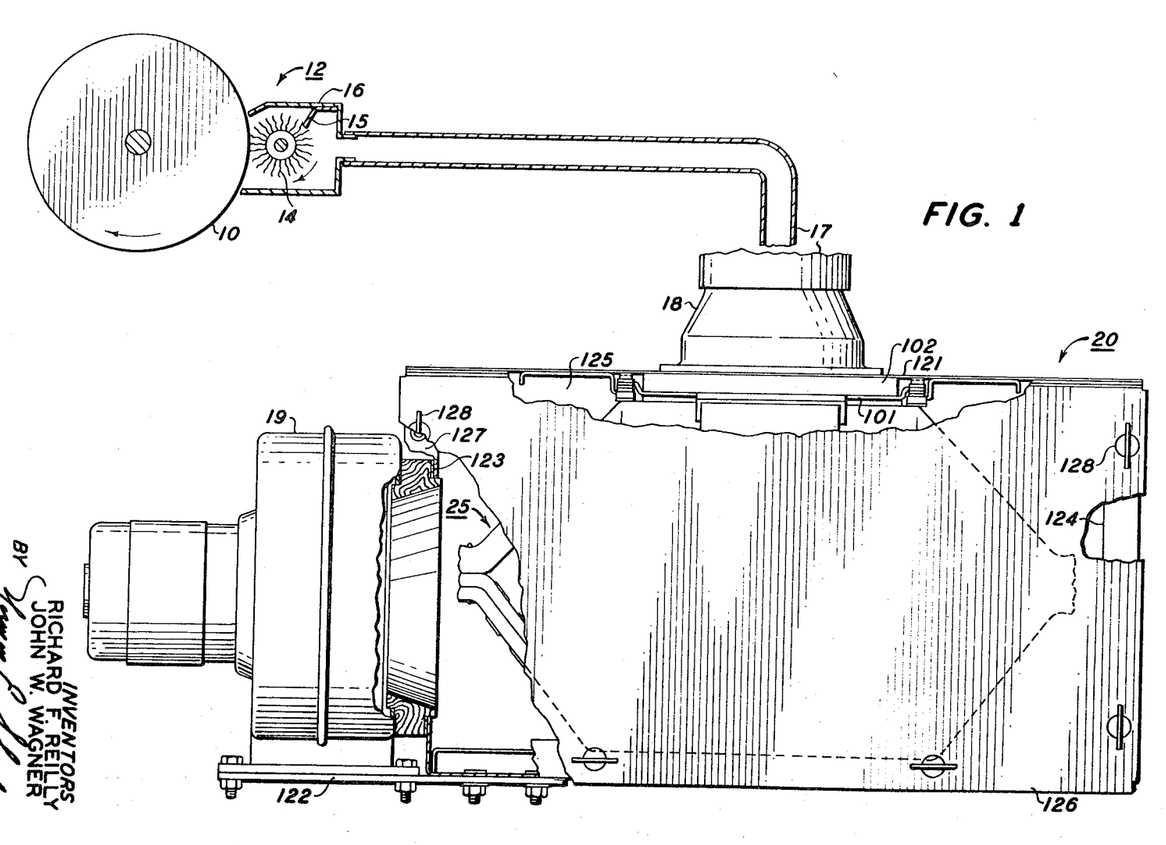
FIG. 1 is a diagrammatic front view of the cleaning station of a xerographic machine wherein a filter box and filter bag, constructed in accordance with one of the embodiments of the invention, is used, parts of the filter box being broken away to show details of construction.

Referring now to the drawings there is shown in FIG. 1 the plate-cleaning station of a xerographic machine, in which 10 generally designates a xerographic plate including a layer of photoconductive insulating material on a conductive backing formed in the shape of a drum, which is suitably journaled for rotation to cause the drum surface sequentially to pass a plurality of xerographic processing stations, including the plate-cleaning station shown, as is common in the xerographic art. The plate cleaning assembly, generally designated 12, comprises a rotatable brush 14 of such construction as to apply extremely light pressure to the photoconductive surface of the xerographic drum to dislodge any particles of residual resin or toner that may adhere thereto. The brush 14, in turn, is cleaned by a flicking bar 15 that is mounted within the hood 16 to contact the ends of the brush bristles, as they rotate, to detach particles of residual resin or toner adhering thereto. The hood 16 encompasses approximately three-fourths of the brush area and is used for containing the particles of residual resin or toner removed from the drum by the brush and by the flicking bar from the brush.

Motor-driven centrifugal blowers 19 are connected by suitable duct system to the hood 16 to draw air through the area surrounding the xerographic dum and the hood. This air will entain particles of residual resin or toner removed from the xerographic drum by the brush and by the flicking bar from the brush. Residual resin or toner particles are separated from the air by a filter 25, to be described in detail hereinafter, so that toner air reaches the motor-driven centrifugal blowers.

To prevent a high pressure drop through the filter 25, the filter is formed in the shape of a bag and it is positioned in an enlarged portion of the discharge duct, this enlarged portion being in the form of a filter box 20 having a removable panel or front cover 126 for access into the interior of the filter box.

In the arrangement of the plate cleaning apparatus shown, a duct 17 is connected at one end to the discharge conduit in the back of hood 16, at its other end the duct is connected to an adapter 18. The opposite end of the adaptor is secured to the top of the filter box 20 with the opening in the adaptor aligned with the discharge opening into the top wall of the filter box. Manifold outlet conduits of the filter box are connected to the inlets of the motor-driven centrifugal blowers.

Figure 6:
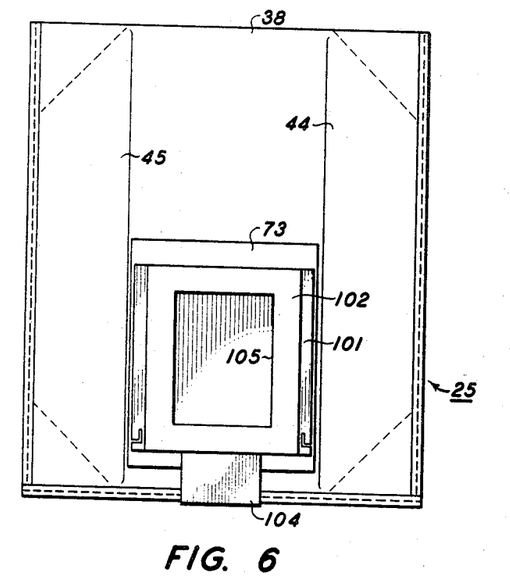
FIG. 6 is a plan view of a filter bag constructed in accordance with the embodiment of the invention illustrated in FIG. 1.
Figure 7:
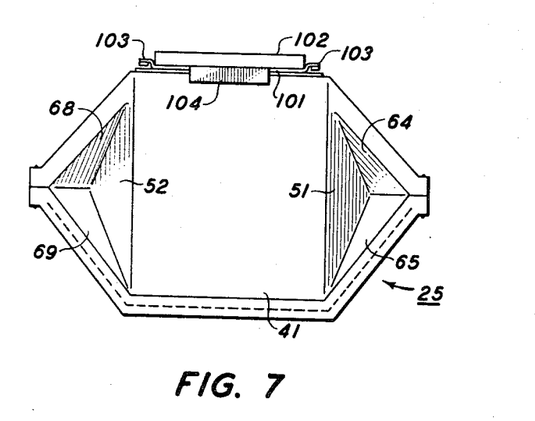
FIG. 7 is a top view of the filter bag of FIG. 6.
Figure 8:
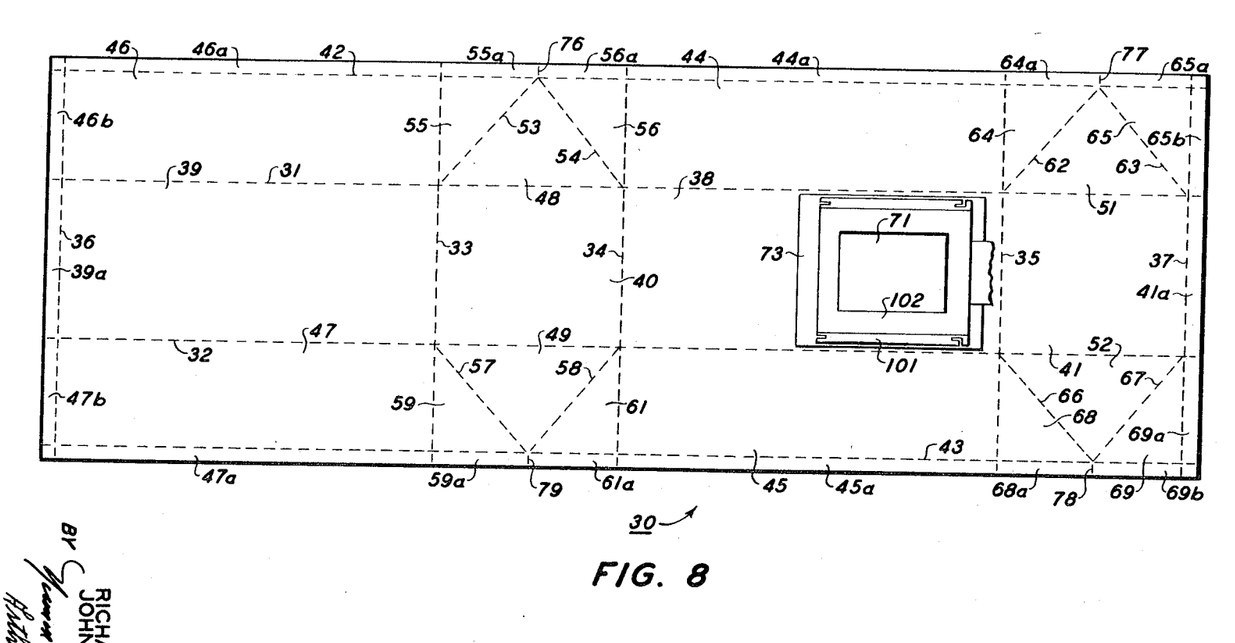
FIG. 8 shows a flat blank assembly from which the filter bag of FIG. 6 is constructed.

Referring now to drawings, and in particular to FIGS. 6, 7 and 8, there is shown a filter bag 25 arranged in accordance with one of the embodiments of the invention, the filter bag being formed with a inner wall of glass wool fibers (fiber glass) loosely assembled into a web or mat of progressive density and an outer wall of loosely assembled glass wool fibers into a web or mat of substantially uniform density to form a self-sustaining structure.

The filter bag 25 is basically similar in construction to the filter bag disclosed in the copending Osborne et al. application, Ser. No. 306,651, in that it is formed of fiber glass with the walls of the filter bag being made of fiber glass loosely assembled into a web or mat of uniform density. This type filter bag, when used to filter toner particles from the plate-cleaning station in an automatic xerographic reproducing apparatus, had a maximum useful life of approximately 18 hours equivalent to the machine processing time required in making approximately 4,000 copies. The criterion by which the useful life of a filter bag, as used in a xerographic reproducing apparatus, will be described in detail hereinafter.

In accordance with the invention, disclosed in the copending Benson et al. application Ser. No. 213,942 the walls of an improved filter bag are constructed whereby the flow of air, containing the particles of residual resin or toner, travels through the filtering medium of progressively increasing density and then through a filtering medium of substantially uniform density, the filtering media being a loosely assembled web or mat of fiber glass.

Figures 2, 3:
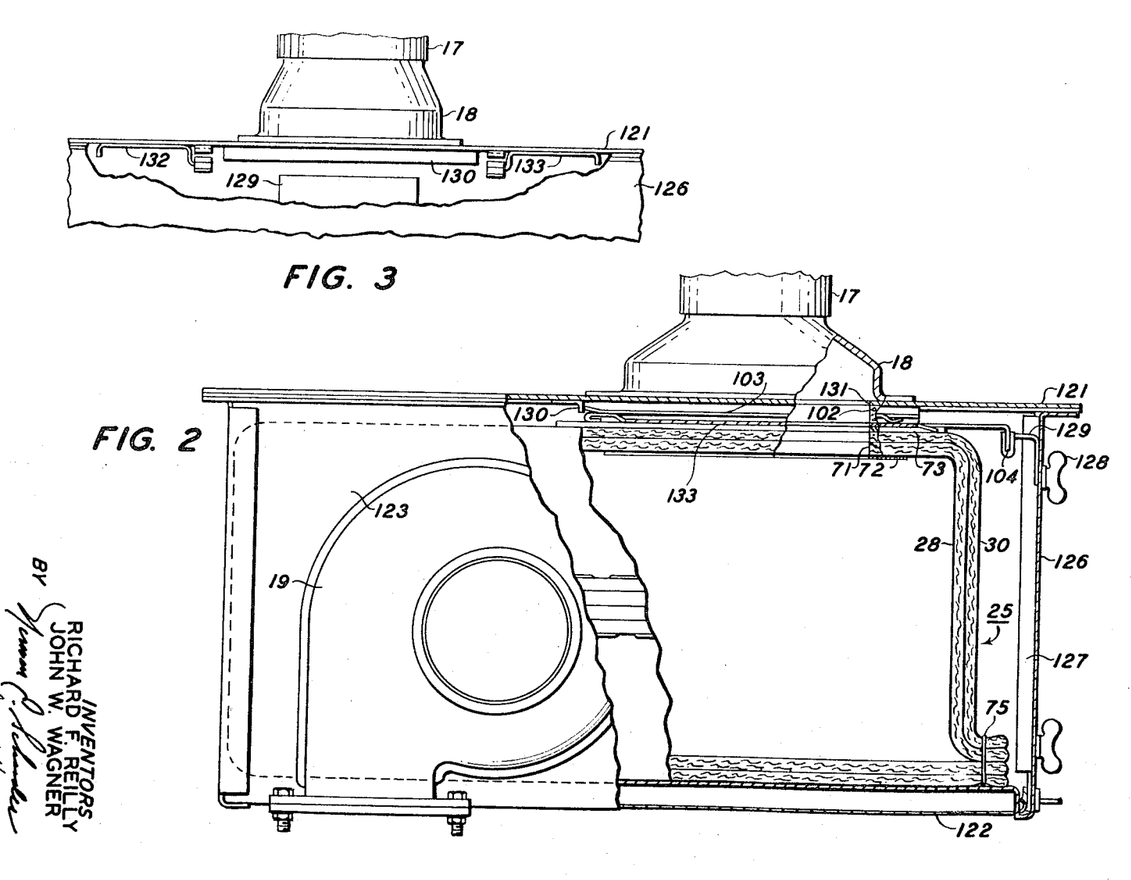
FIG. 2 is a ride elevation of the filter box of FIG. 1 with portions removed to show details of the filter bag.
FIG. 3 is another view of the discharge duct into the filter box, as seen in FIG. 1, with the filter bag removed.

In the embodiment of the filter bag arrangement shown in FIG. 2, a single mat of fiber glass having, in cross section, an area of progressive density and then an area of uniform density may be used in fabricating the filter bag or as shown, the filter bag may be formed from two mats of fiber glass, a flat blank 28 of fiber glass mat material of progressive density to form the inner walls of the filter bag and a flat blank 30 of fiber glass mat material of substantially uniform density to form the outer wall of the filter bag, the denser side of the blank 28 being positioned adacent the surface of blank 30.

Since the filter bag 25 is fabricated from flat blanks 28 and 30 of substantially uniform width and length and are folded in the same manner only blank 30 is illustrated and described in detail, the inside of this blank being shown in FIGURE 8. By means of an appropriate pattern of fold lines, shown for blank 30 in FIGURE 8, the blanks are divided into a plurality of panels and areas which are utilized for the walls and the closure parts of the filter bag when it is erected.

The central and major areas of the blank 30 become the outer body of the container and is defined by spaced-apart, longitudinal fold lines 31 and 32 running in substantially parallel relation across the inside face of the blank. At substantially right angles thereto and intersecting the fold lines 31 and 32 and at spaced intervals therealong, is a series of parallel transverse fold lines 33, 34 and 35 and combined fold-and-seam lines 36 and 37 which define in the central and major area of the blank front panel 38, rear panel 39, bottom panel 40, and top panel 41.

Integrally with the front rear, bottom, and top panels 38, 39, 40 and 41 respectively in the blank but separated therefrom by the longitudinal fold lines 31 and 32 is a plurality of panel extentions which when folded and secured together, as described hereinafter, form gable-like end closures for the filter bag. These areas include longitudinal fold-and-seam lines 42 and 43 parallel to fold lines 31 and 32, and spaced between the latter and the top and bottom edges, respectively, of the blank.

For enclosing the ends of the filter bag front panel 38 has connected therewith inclined end panels 44 and 45, rear panel 39 has connected therewith inclined end panels 46 and 47. Similarly, bottom panel 40 has connected therewith triangular end panels 48 and 49, and top panel 41 has connected therewith triangular end panels 51 and 52.

End panel 48 is defined in part by fold line 31 and by fold lines 53 and 54 which converge and intersect at fold-and-seam line 42, defining one side each of the triangular fold-back panels 55 and 56, respectively, flanking end panel 44. In a similar fashion end panel 49 is defined by a portion of fold line 32 and converging fold lines 57 and 58 which also respectively form sides of triangular fold-back panels 59 and 61; end panel 51 is defined by a portion of fold line 31 and converging fold lines 62 and 63 which also form sides of triangular fold-back panels 64 and 65, respectively; and end panel 52 is defined by a portion of fold line 32 and converging fold lines 66 and 67 forming boundary lines of triangular fold-back panels 68 and 69, each of the fold-back panels flanking its respective end panel.

Prior to the final erection step in which the blank 30 of fiber glass is fabricated with blank 28 into filter bag 25, the front panel 38 of both blanks are cut to form an inlet passage 71 therein as shown in FIG. 2. An inner gasket 72 is secured to the inner surface of the inner blank 28, for example, by a staple in each corner, the stapling being done from the inner side of the blank. An outer gasket 73 is secured to the outer surface of the outer blank 30. Both gaskets 72 and 73, made, for example, of cardboard or other stiff material, are positioned with the openings in these gaskets in alignment with the inlet passage 71 of the blanks 28 and 30.

As shown in FIGS. 4–7, a flange 101, made, for example, of sheet metal, is secured in a suitable manner as by staples, to the top of the outer gasket 73. A compressible gasket, generally indicated by reference numeral 102, may be secured as by cement to the top of flange 101. The gasket 102 is preferably made of suitable cellular materials, such as synthetic resilient foam materials. The flange 101, substantially rectangular in the form shown, with upturned and laterally extending sides 103 has a depending trailing edge portion 104, for a purpose to be described, and an aperture 105 of a suitable size and shape to correspond to the discharge opening in the top of the filter box. The gasket 102 may be formed as a unitary piece or, in the form of strips cemented around the outer boundaries of aperture 105.

To transform the blanks 30 and 28 into the completed filter bag illustrated, the blanks are first folded upon themselves to form an open-ended tube with the top panel 41 and rear panel 39 of both blanks fastened together by suitable fastening means, such as staples 75 as shown in FIG. 2, inserted through the material of the blanks along the full length of the fold-and-seam lines 36 and 37. The ends of the filter bag are then closed by infolding the end panels and fold-back panels into a gable-like end closure secured as by staples along the fold-and-seam lines 42 and 43.

As is typical of any stapling or sewing operation, sufficient space must be left remaining adjacent to the desired seam or fastening line to prevent the fasteners from tearing loose from the edge of the material. To provide sufficient material adjacent the staples to prevent them from tearing loose from the material, marginal panels 46a, 55a, 56a, 44a, 64a, 65a, 65b, 41a, 69a, 69b, 68a, 45a, 61a, 59a, 47a, 47b, 39a and 46b are formed by material between the fold-and-seam lines 42, 37, 43, and 36, and the four edges of the blank; the marginal panels being further defined by fold lines 33, 34 and 35, previously described, and by fold lines 76, 77, 78 and 79 intersecting the converging fold lines defining the fold-back panels. These marginal panels enable the staples to retain a suitable purchase in the material to compress the panels into sealing relationship with each other in areas where they are fastened together. Whether the seams of the filter bag are made by stapling, as described above, or by other means such as by sewing or gluing the panels together along the seam lines, the resulting seams should be formed to prevent the escape of aeriform fluid from the bag through any portion of the bag along the seams. In the case of staples, an efficient seam may be made by placing the staples close together or in overlapping position.

The assembled filter bag is mounted in the filter box, in a manner to be described, whereby the filter bag is seated against the upper wall of the filter box with the filter media extending downstream. In the embodiment shown in FIGS. 1 and 2, the filter box 20 consists of a top wall 121, bottom wall 122, side walls 123 and 124, rear wall 125 and front cover 126 removably secured as by studs 128 engaging suitable apertures in channels 127 secured to the side walls. The top wall 121 has an opening 131, forming the discharge opening into the filter box, which is in alignment with the opening in adaptor 18.

Slides 132 and 133 are secured to the underside of top wall 121 on opposite sides of opening 131 with the forward portion of each slide toward the front of the box in order to receive the sides 103 of the flange 101 of the filter bag.

Figure 4:
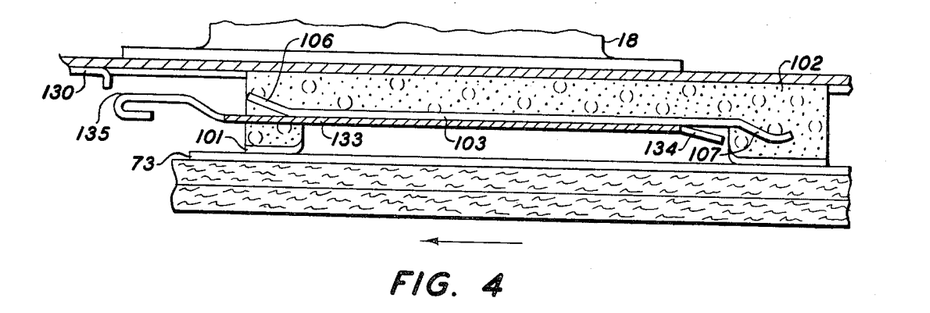
FIG. 4 is an enlarged view of the discharge duct and filter bag mounting, as seen in FIG. 2, with the filter bag partly removed.
Figure 5:
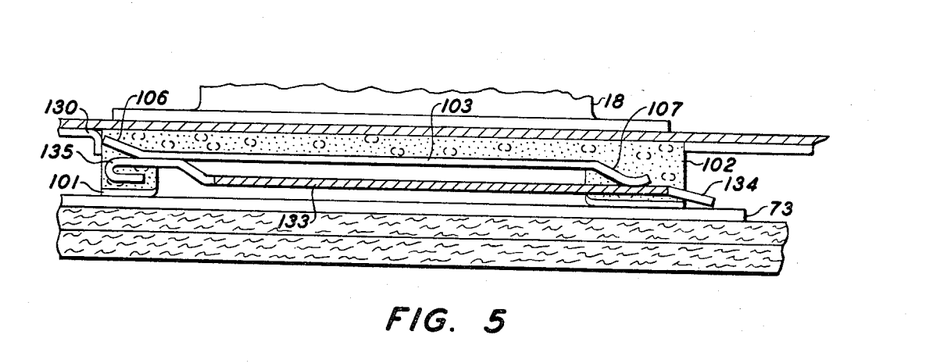
FIG. 5 is a view similar to FIG. 4 with the filter bag in operating position.

As shown in greater detail in FIGS. 4 and 5, the slides 132 and 133 each have a lateral extending substantially flat slide portion to receive the sides 103 of the flange 101 in a manner similar to a drawer slide. Each slide has a depending ramp portion 134 at its leading edge and an inclined cam portion 135 at its trailing edge. The sides 103 of the flange 101 are formed in a similar but reversed configuration, that is, with an inclined ramp portion 106 at its leading edge and a declined cam portion 107 at its trailing edge.

As a filter bag is inserted into the slides in the filter box, as seen in FIG. 4, the flat slides 103 of the flange 101 will ride or slide on the flat slide portions of slides 132 and 133 to permit the gasket 102, of a predetermined height in its noncompressed condition, to slide beneath the top wall out of interference relation therewith. With this arrangement, the filter bag can be almost completely advanced into operative position within the filter box.

However, as the filter bag is advanced to the position shown in FIG. 5, the cam portions on the slides and flange will engage the mating ramp portions of these opposing elements causing the distance between the flange 101 and top wall 121 to decrease, in turn causing the gasket 102 to engage the top wall. Further advancement of the filter bag and flange to the position shown in FIG. 5 will rapidly further decrease this distance with the result that the gasket 102 will be compressed around the exhaust opening 131 in the top wall 121. Because of the resilient expansion of the gasket 102, a dustproof seal is formed around the exhaust opening.

The filter bag is held in this operative position by closure of front cover 126, the L bracket 129 secured to the inside of this cover contacting the depending trailing edge portion 104 of flange 101, with movement of the bag to the left, as seen in FIG. 2, being limited by stop 130, secured to the underside of top wall 121 in interference relation with the leading edge 106 of flange 101. With this arrangement of apparatus, it is apparent that filter bags can be readily removed and clean bags inserted in the exhaust system of a plate-cleaning station of a xerographic apparatus, or similar vacuum cleaning system.

With an air duct or passage of a given area, it is apparent that a filter bag constructed of a fiber glass material as shown would have approximately six times the filtering area of a conventional flat panel fiber glass filter and the mounting arrangement disclosed provides for quick replacement of filter bags.

Although only a mat or mats of loosely assembled fiber glass are used in fabricating the filter bag, there is provided a filter bag having sufficient rigidity to support itself independently of filter box 20, whereby the entire surface area of the bag is available to permit passage of air.

Since all of the panel elements of the filter bag function as filtering elements, a filter of relatively large filtering area for the cross-sectional area of an air duct or passage is provided in the filter box. Due to the relatively low pressure drop required across the filter, the centrifugal blowers 19 are only required to produce sufficient vacuum pressure to entrain the toner particles in a relatively slowly moving stream of air.

In the embodiment of FIGS. 9–13, the compressible gasket that is equivalent in function to the gasket 102 of the embodiment of FIGS. 1–8 is secured to the filter box top wall or cover and another gasket is secured between two metallic flanges. There is provided a mounted frame and means for securing the bag to the frame which permits easy disposal of the filter bag when it has served its purpose.

The filter bag 150 of FIGS. 9–13 is the same as the bag 25 in the embodiment of FIGS. 1–8 and is formed with an inlet passage 151 around which is secured by staples an inner gasket 152 and an outer gasket 153 which may be identical to the gaskets 72, 73, respectively, in FIG. 2. A compressible gasket 154, similar to the gasket 102 in construction and material, is secured as by cement to the top of a flange 155 which is stapled to the top of the outer gasket 153. An upper flange 156, made, for example, of sheet metal, is secured as by cement on top of the compressible gasket 154. The flanges 155 and 156 are substantially rectangular in the form shown, with apertures 157 and 158, respectively, of a suitable size and shape to correspond to the discharge opening in the top of the filter box.

Figure 13:
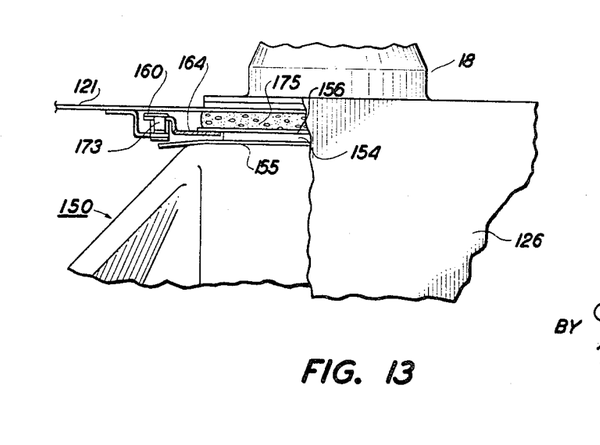
FIG. 13 is a fragmentary view of the filter bag and frame of the second embodiment mounted in the filter box.

The assembled fiter bag is mounted in the filter box, in a manner to be described, whereby the filter bag is seated against the upper wall of the filter box with the filter media extending downstream. In the embodiment shown in FIGS. 9–13, the filter box is the same as that shown in FIGS. 1 and 2, and proper orientation of the bag 150 relative to the top wall 121 is illustrated in FIG. 13.

The top wall 121 has an opening forming the discharge opening into the filter box, which is in alignment with the opening in adaptor 18. In addition, the slides 132 and 133 are utilized, as shown in FIG. 3, and in the same position.

Figures 9, 10, 11, 12:
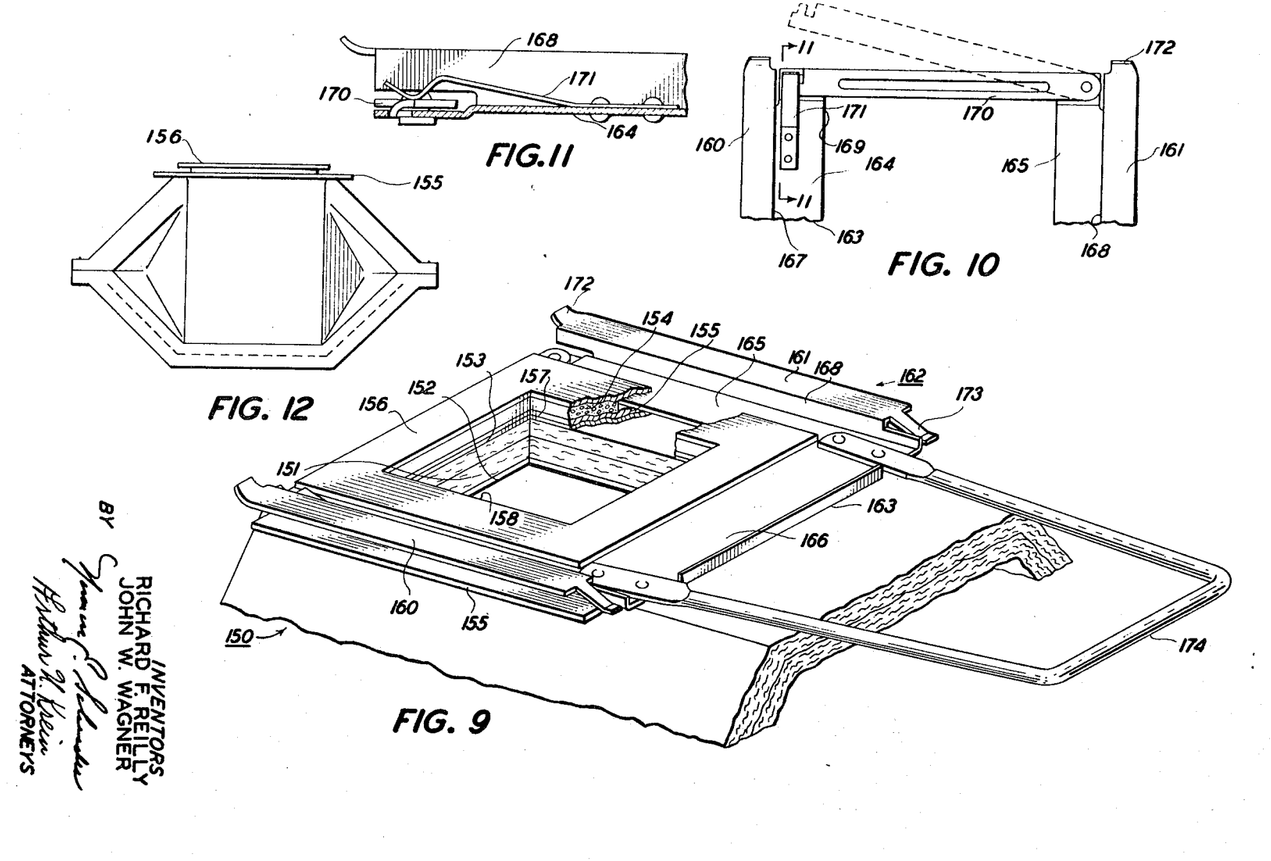
FIG. 9 is a fragmentary view in perspective of a second embodiment of the invention.
FIG. 10 is a fragmentary view of a detail of the second embodiment.
FIG. 11 is a cross-sectional view taken on line 11–11 of FIG. 10.
FIG. 12 is a plan view of the filter bag utilized in the second embodiment.

The slides 132 and 133 are adapted to receive the left and right-hand slide members 160 and 161, respectively, of a filter bag mounting frame, generally connotated as reference numeral 162 in FIG. 9, by which means the filter bag 150 is secured adjacent and in alignment with opening 131 in the filter box.

The frame 162 includes a U-shaped base plate 163 formed with spaced parallel side members 164, 165, a light portion 166, all of which are coplanar, upturned edges 167, 168, secured to the members 164, 165, respectively, and the slide members 160, 161 which are secured, respectively to the edges 167, 168, respectively. An opening 169 is provided between the side members 164 and 165 to allow for insertion of the intake opening of the filter bag 150 in a position whereby the inner edges of the side members 164, 165, and the light portion 166 that make up the base plate 163 abut the outer surfaces of the seal 154 on three sides, and the side members 164, 165 and the light portion 166 are positioned between the lower surface of upper flange 156, and the upper surface of lower flange 155 as seen in FIGS. 9 and 12.

A latch bar 170 is pivotably mounted on the outer end of the right-hand side member 165, as seen in FIG. 11, by suitable means to provide for securing the filter bag 150 to the frame 163. A spring latch 171 is fastened adjacent the outer end of the left-hand member 164 of base plate to keep the bar 170 closed to secure the filter bag in position for use. The right and left-hand slide members 160 and 161 are provided to secure the filter bag by means of the flanges 155 and 156 to the under surface of the top wall 121. These slide members are formed as an integral part of the frame; however, it is understood that they may be formed as separate pieces and attached to the frame by suitable brackets.

As previously described in relation to the embodiment of FIGS. 1–8, the slides 132 and 133 secured to the filter box 20, each have a lateral extending substantially flat slide portion 133 to receive the slide members 160, 161 of the filter bag mounting frame 162 in a manner similar to a drawer slide. Each slide has a depending ramp portion 134 at its leading edge and an inclined cam portion 106 at its trailing edge. The slide members 160 and 161 of the frame 162 are formed in a similar but reversed configuration, that is, with an inclined ramp portion 172 at the leading edges and a declined cam portion 173 at their trailing edges.

As a filter bag, mounted in the frame 162 is inserted into the slides 132 and 133 of the filter box by means of a handle 174 attached to the light portion 166 of the base plate 163, the slide members 160, 161 of the base plate will ride or slide on the flat slide portion of slides 132 and 133 to permit the upper flange 156 of the filter bag 150, of a predetermined height due to the noncompressed condition of gasket 154, to slide beneath the top wall 121 out of interference relation therewith. With this arrangement, the filter bag can be completely advanced into operative position within the filter box.

However, as the filter bag is advanced, the cam portions on the slide members and the slides 132, 133 will engage the mating ramp portions of these elements causing sliding engagement between the upper flange 156 and a compressible gasket 175 secured to the top wall 121 and surrounding the discharge inlet 131. Further advancement of the filter bag and flange 156 will result in the gasket 175 being compressed by the upward moving flange 156. Because of the resilient nature of the gasket 175, a dustproof seal is formed around the exhaust opening.

The filter bag is held in this operative position by closure of front cover 126, in the same manner for the embodiment of FIGS. 1–8, with movement of the bag to the left being limited by stop 130, secured to the underside of top wall 121 in interference relation with the leading edge 106 of the slide members 160, 161. With this arrangement of apparatus, it is apparent that filter bags can be readily removed from the filter box 20 and then detached from its mounting frame 162 and clean bags inserted in the exhaust system of a plate-cleaning station of a xerographic apparatus.

While the invention has been described with reference to the structures disclosed herein, it is not confined to the details set forth, and this application is intended to cover such modification or changes as may come, within the purpose of the improvements of the scope of the following claims.

What is claimed is:

1. A filtering apparatus for filtering an aeriform fluid flowing through a fluid duct about which an outwardly extending wall member having a discharge inlet therein is secured with the discharge inlet in alignment with the duct, said apparatus including a pair of slides secured to the wall member each of said slides having a cam element thereon, said slides being positioned in substantially parallel relation to each other on opposite sides of the discharge inlet, a filter bag including a wall portion having an inlet opening therein and a flange formed with an aperture, said flange being connected to the outer side of said wall portion and positioned so that the aperture in said flange is axially aligned with said inlet opening in said wall portion, an apertured gasket secured to said flange with the aperture being substantially in alignment with said flange aperture, cam portions operatively associated with said flange and engageable with said cam elements on said slides such that the filter bag is positioned in operative relation with the discharge inlet when said cam portions are into engagement with said cam elements on said slides on the wall member whereby the flange will be cammed upwardly to form a dustproof seal between said filter bag and said wall member.

2. A filtering apparatus for filtering an aeriform fluid flowing through a fluid duct about which an outwardly extending wall member having a discharge inlet therein is secured with the discharge inlet in alignment with the duct, said apparatus including a pair of slides secured to the wall member each of said slides having a cam element thereon, said slides being positioned in substantially parallel relation to each other on opposite sides of the discharge inlet, a filter bag including a wall portion having an inlet opening therein and a flange formed with an aperture, said flange being connected to the outer side of said wall portion and positioned so that the aperture in said flange is axially aligned with said inlet opening in said wall portion, an apertured compressible gasket secured to the downstream side of said wall member with the aperture being substantially in alignment with said discharge inlet, cam portions carried by said flange and engageable with said cam elements on said slides such that the filter bag is positioned in operative relation with the discharge inlet when said cam portions are inserted into engagement with said cam elements on said slides on the wall member whereby the flange will be cammed upwardly to compress the gasket against the wall member and flange to form a dustproof seal between said filter bag and said wall member.

3. A filtering apparatus for filtering an aeriform fluid flowing through a fluid duct about which an outwardly extending wall member having a discharge inlet therein is secured with the discharge inlet in alignment with the duct, said apparatus including a pair of slides secured to the wall member each of said slides having a cam element thereon, said slides being positioned in substantially parallel relation to each other on opposite sides of the discharge inlet, a filter bag including a wall portion having an inlet opening therein and a flange formed with an aperture, said flange being connected to the outer side of said wall portion and positioned so that the aperture in said flange is axially aligned with said inlet opening in said wall portion, an apertured compressible gasket positioned downstream of said wall member with the aperture being substantially in alignment with said discharge inlet and said flange aperture, a frame having frame members defining an opening in alignment with said aperture, said frame being engageable with said flange and having cam portions thereon cooperable with said cam elements on said slides whereby the filter bag is positioned in operative relation with the discharge inlet when the frame members are inserted into said slides on the wall member such that said cooperable cam portions and cam elements will cam the flange upward to form a dustproof seal between said filter bag and said wall member.

4. A filtering apparatus for filtering an aeriform fluid flowing through a fluid duct about which an outwardly extending wall member having a discharge inlet therein is secured with the discharge inlet in alignment with the duct, said apparatus including a pair of slides secured to the wall member each of said slides having a cam element thereon, said slides being positioned in substantially parallel relation to each other on opposite sides of the discharge inlet on the downstream side thereof, a filter bag including a wall portion having an inlet opening therein and a flange formed with an aperture, said flange being connected to the outer side of said wall portion and positioned so that the aperture in said flange is axially aligned with said inlet opening in said wall portion, an apertured compressible gasket secured to the downstream side of said wall member with the aperture being substantially in alignment with said discharge inlet, a frame having frame members defining an opening in alignment with said aperture, said frame being engageable with said flange and having cam portions thereon cooperable with said cam elements on said slides whereby the filter bag is positioned in operative relation with the discharge inlet when the frame member is inserted in said slides on the wall member such that the cooperable cam elements and cam portions will cam the flange upward to compress the gasket against the wall member to form a dustproof seal between said filter bag and said wall member, said frame having means for detachably mounting said filter bag thereto.

References Cited

UNITED STATES PATENTS

| | | | |
|---|---|---|---|
| 1,853,808 | 4/1932 | Greenwood | 248—312 |
| 2,480,411 | 8/1949 | Kennedy | 248—312 |
| 2,596,806 | 5/1952 | Borkoski | 55—367 |
| 2,758,667 | 8/1956 | Brace | 55—362 |
| 2,766,844 | 10/1956 | Humphrey | 55—376 X |
| 2,781,103 | 2/1957 | Daiger et al. | 55—376 |
| 2,795,289 | 6/1957 | Dresnek | 55—376 |
| 2,864,462 | 12/1958 | Brace | 55—367 |
| 2,870,863 | 1/1959 | Bramhall | 55—376 |
| 2,975,862 | 3/1961 | Goldberg | 55—376 |
| 3,260,038 | 7/1966 | Casady | 55—377 X |
| 2,308,310 | 1/1943 | Ruemelin et al. | |

HARRY B. THORNTON, *Primary Examiner.*

D. TALBERT, Jr., *Assistant Examiner*